United States Patent

Mucci et al.

[11] 3,949,643
[45] Apr. 13, 1976

[54] PROFILING DEVICE

[76] Inventors: Rinaldo Mucci, Via Foppa 22; Paolo Bremi, Largo Domodossola 2, both of Milan, Italy

[22] Filed: Apr. 26, 1974

[21] Appl. No.: 464,985

[30] Foreign Application Priority Data
May 14, 1973 Italy.................................. 24029/73

[52] U.S. Cl....................... 90/24 R; 29/95.1; 82/1.3
[51] Int. Cl.². ........................................... B23D 9/00
[58] Field of Search ....... 90/24 R, 52, 63, 95, 11 A; 82/1.3, 18; 29/95.1, 57; 279/6

[56] References Cited
UNITED STATES PATENTS
| | | | |
|---|---|---|---|
| 1,123,045 | 12/1914 | Warren | 90/24 R |
| 1,482,110 | 1/1924 | Bolesky | 90/24 R |
| 2,919,615 | 1/1960 | Brown | 82/18 X |
| 3,641,871 | 2/1972 | Vig | 90/11 A |

Primary Examiner—Leonidas Vlachos
Attorney, Agent, or Firm—V. Alexander Scher

[57] ABSTRACT

A profiling device for use with a machine tool includes a sleeve adapted to be attached to the machine tool and a tool carrier shaft rotatably mounted in the sleeve. The axis of the shaft is offset at a working angle relatively to the axis of the sleeve, so that the shaft carries out an oscillatory movement relatively to the sleeve when the shaft or the sleeve are rotated. The outer end of the shaft is adapted to receive a suitably shaped tool which can cut progressively into a workpiece until the entire profile has been produced when the relative rotational velocity of the workpiece and the tool is substantially zero.

2 Claims, 5 Drawing Figures

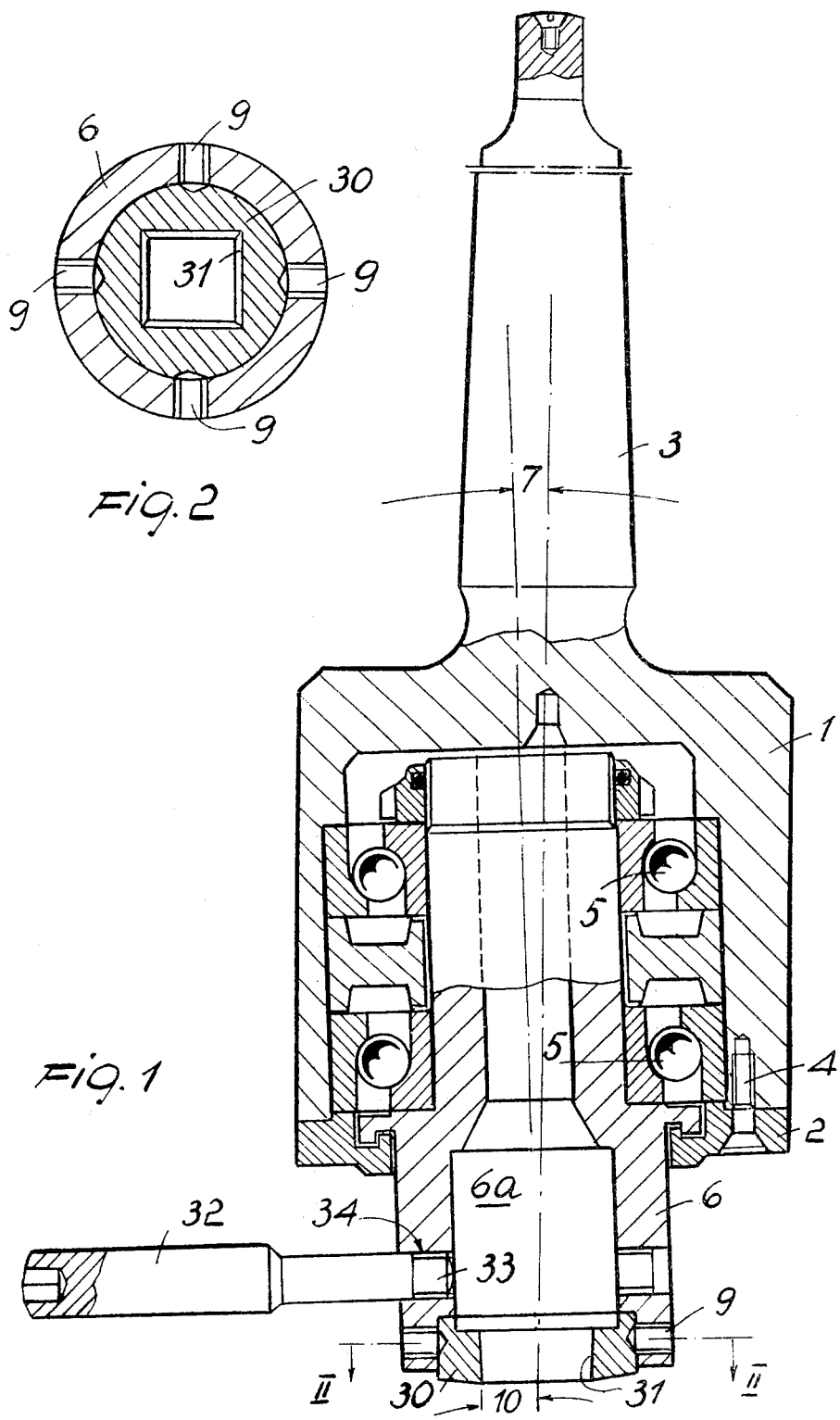

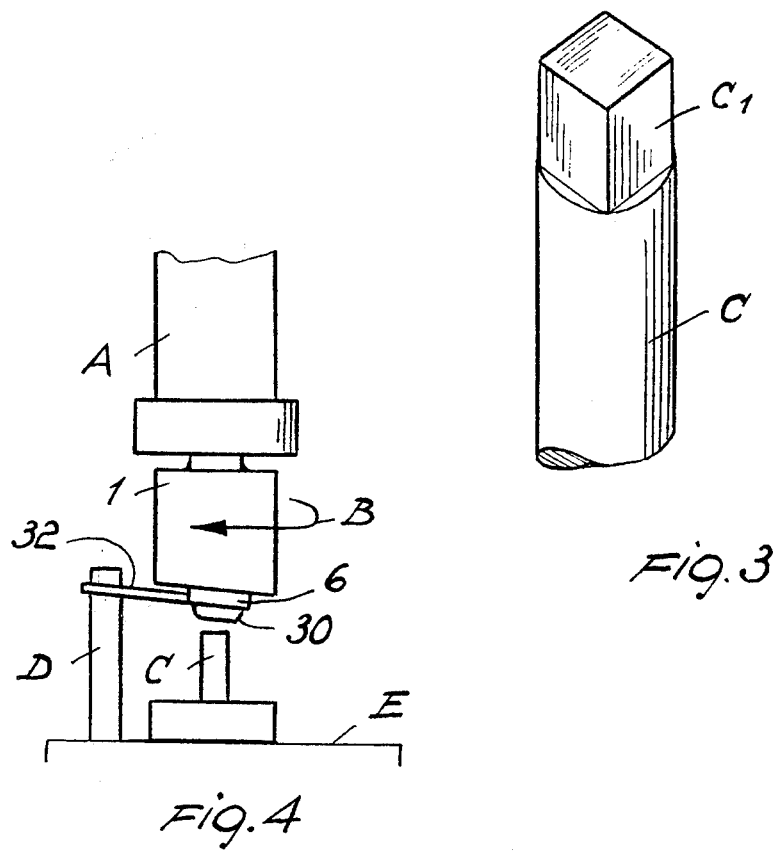
Fig. 3
Fig. 4
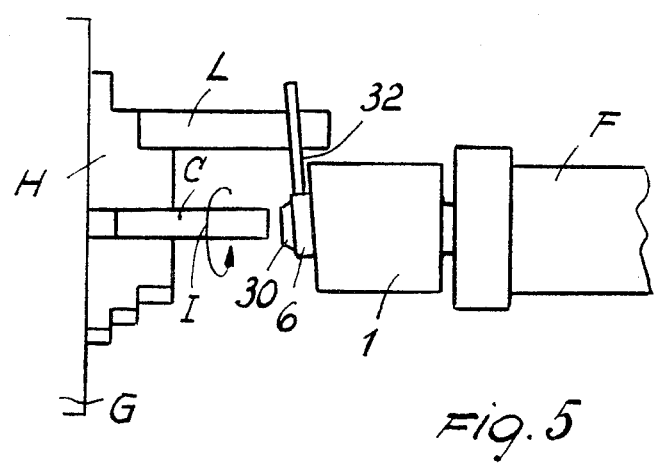
Fig. 5

PROFILING DEVICE

This invention relates to profiling devices for use with machine tools.

Slots and other shaped profiles are now produced by removing material by broaching, milling and other machine tool techniques.

A drawback of all these methods is that they are comparatively slow and expensive.

An object of the present invention is to provide a profiling device which is cheaper to manufacture and more efficient in operation than prior art devices.

Other objects of the present invention will become apparent in the course of the following specification.

In accomplishing the objectives of the present invention, it was found desirable to provide a profiling device for use with machine tools, comprising a sleeve adapted for attachment to a machine tool, a tool carrier shaft rotatably mounted in the sleeve with the axis thereof offset from the axis of the sleeve at a working angle, so that the tool carrier shaft describes an oscillatory movement relative to the sleeve when it or the sleeve are relatively rotated, the tool carrier shaft having an outer end shaped to receive a shaped tool of the desired profile capable of cutting progressively into a workpiece until the entire profile has been obtained when the relative rotational velocity of the workpiece and the tool is substantially zero.

The outer end of the tool carrier spindle is shaped to receive either a male or female tool shaped with a profile identical with that which the workpiece is to have, so that when a linear advance is imparted to the workpiece or to the device, the cutting edges of the tool, which are inclined in the direction of the workpiece, will progressively cut linearly and perimetrally into the workpiece until the profile of the desired extent, either blind or passing through the workpiece, is obtained, the rotational speed of the tool in relation of the workpiece being made equal to zero. The tool may have a rake at least equal to the working angle of the tool, so as to obtain a profile which is perfectly shaped in line with the axis of the sleeve.

A male tool is used to produce profiled slots, and a female tool is used to produce outer profiles.

Preferably, the tool carrier spindle is provided with a rod disposed substantially transverse to the shaft and having a length such as to be able to contact a stop device or a driving part of the machine tool so as to obtain an accurate starting position of a tool in relation to the profile to be machined in the workpiece, and also to prevent the screwing of the tool into the workpiece, particularly when the profile to be produced is of considerable length.

The invention will appear more clearly from the following detailed description, with reference to the accompanying drawings, showing, by way of example only, a preferred embodiment of the inventive idea.

IN THE DRAWINGS

FIG. 1 shows a device according to the invention partly in section along its axis;

FIG. 2 is a cross-section on the line II—II in FIG. 1;

FIG. 3 is a part machined with the device shown in FIG. 1, shown in perspective;

FIG. 4 shows diagrammatically an application of the device shown in FIG. 1, a vertical drill.

FIG. 5 shows diagrammatically the application of the same device to a lathe.

The device shown in the drawings comprises a sleeve 1 terminating in a flange 2 at the bottom end and at the top end in a conical portion 3 to facilitate attachment to a machine tool. The flange 2 is fastened to the sleeve 1 in a detachable manner by means of screws 4, while the cone 3 is integral with the sleeve 1.

Inside the sleeve 1 and the flange 2, a tool carrier shaft 6 is mounted for free rotation on sliding thrust ball bearings 5, the axis of the shaft being offset from that of the sleeve to provide a working angle 7. The shaft 6 is so shaped and supported in the sleeve that it cannot be displaced in the longitudinal direction.

At the bottom end of the shaft 6 is fastened the tool 30, which, in this particular case, is a female screw. The fastening is achieved by means of transverse screws 9, so that the tool can be replaced by another tool of the same or different profile, or by a male tool for the production of hollow profiles, if desired.

This tool 30 has a rake 31 converging towards the outside and inclined at an angle 10 at least equal to the aforesaid working angle 7 of the device so as to make it possible to produce shaped profiles coaxially to the sleeve 1, as described above. If it is desired to produce hollow profiles, a male tool (not illustrated) must, in this case, have a rake angle 10, which is divergent towards the outside of the device.

As illustrated, the shaft 6 is hollow, so that, in its cavity 6a, it can receive a machined part $C_1$ of a workpiece C (FIG. 3), or else the tail of a male tool when the implement is to produce hollow profiles. In order to produce hollow profiles with a certain precision, it is, however, advantageous to replace the shaft 6 by another shaft already provided with a male tool. In order to effect this operation, it is sufficient to remove the flange 2 from the sleeve 1 by unscrewing the screws 4.

Transversely to the shaft 6, between the tool and the flange 2, is disposed a rod 32, which may be removable, secured in position by screwing its threaded end 33 into a corresponding threaded seat 34 in the shaft 6.

As already stated, the rod 32 angularly positions the tool at the beginning of the operation and supports it in order to prevent it from screwing onto the workpiece, possibly as the result of friction in the bearings 5 and/or other elements supporting the shaft 6 in the sleeve 1.

As previously stated, the device may be installed in any conventional machine tool, either holding the sleeve 1 fixed and rotating the tool carrier shaft 6, or holding the latter fast and imparting the working rotation to the sleeve itself. In both cases, the device and/or the workpiece may be advanced as desired, and in accordance with the type of machine used.

FIG. 4 shows the installation of the device according to the present invention in a drilling or similar machine. In this application, the sleeve 1 rotates with the mandrel A in the direction B, while the tool 30 is held fast like the workpiece C by means of the positioning rod 32 which is supported against a fixed part D of the work carrier bed E. The working advance is imparted to the device by pushing it in the downward direction.

FIG. 5 shows another example of installation of the device of the invention in a lathe. In this case, the sleeve 1 is fixed and is pushed against the workpiece C by the tailstock F of the machine G, while the tool 30 is driven in the direction I by the mandrel H at the same speed as the workpiece C by means of an extension L provided on the mandrel H and acting, as illustrated, against the rod 32, which, in this case, serves as means of driving the tool.

In both these examples of installation of the tool in machine tools, it is obvious that the relative speed of the workpiece in relation to the tool is always zero, so that, as previously indicated, the tool 30 acts by thrust, progressively and perimetrally, on the workpiece C which has previously been turned with an outside diameter circumscribing the desired profile until the profile $C_1$ has been completely produced, operating similarly to a linear slotter provided with an oscillatory pendular movement.

The profiling device described above is capable of producing very easily and quickly profiled slots or outer profiles of any shape, e.g., polygonal, elliptical, denticulate or other section, starting from a circular hole previously formed in a workpiece with a diameter smaller than the profile which is to be obtained, or from a cylinder previously turned with a diameter greater than the profile which is to be obtained.

What is claimed is:

1. A profiling device, comprising a sleeve, a conical portion extending from one end of said sleeve for attaching it to a machine tool, a flange detachably connected to the other end of said sleeve, a hollow tool carrier shaft rotatably mounted in said sleeve and having a longitudinal axis extending at an acute angle to the longitudinal axis of said sleeve, said flange supporting said shaft, sliding thrust ball bearings supporting said tool carrier shaft within said sleeve, whereby the tool carrier shaft describes an oscillating movement relatively to the sleeve when it or the sleeve are relatively rotated, a portion of said shaft extending beyond said sleeve, a positioning rod extending transversely to said shaft and having an end screwed to said portion of the shaft, and a shaped tool screwed to the end of said portion of the shaft.

2. A device according to claim 1, wherein the tool is a male tool having a rake angle diverging towards the workpiece.

* * * * *